US012567551B2

(12) United States Patent
Lacoste et al.

(10) Patent No.: US 12,567,551 B2
(45) Date of Patent: Mar. 3, 2026

(54) ELECTRICAL PROTECTION DEVICE OF CIRCUIT-BREAKER TYPE WHICH CAN BE POSITIONED ON A CONTINUOUS ELECTRICAL CABLE

(71) Applicant: Airbus Operations SAS, Toulouse (FR)

(72) Inventors: Jean-Marc Lacoste, Toulouse (FR); Vincent Duflos De Saint Amand, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 202 days.

(21) Appl. No.: 18/482,127

(22) Filed: Oct. 6, 2023

(65) Prior Publication Data

US 2024/0136134 A1 Apr. 25, 2024
US 2024/0234065 A9 Jul. 11, 2024

(30) Foreign Application Priority Data

Oct. 20, 2022 (FR) ...................................... 2210835

(51) Int. Cl.
*H01H 71/10* (2006.01)

(52) U.S. Cl.
CPC .................................. *H01H 71/10* (2013.01)

(58) Field of Classification Search
CPC .. H01H 39/006; H01H 9/30; H01H 2039/008; H01H 71/10; H01H 85/201; H02G 15/18
See application file for complete search history.

(56) References Cited

U.S. PATENT DOCUMENTS 9,774,179 B1 9/2017 Marcath et al.
11,594,391 B2 * 2/2023 Channakesavelu .... H01H 85/10
12,057,280 B2 * 8/2024 Weinkopf ................ H01H 9/30
2003/0230177 A1 12/2003 Hamilton et al.
2019/0287751 A1 9/2019 Gonthier et al.

FOREIGN PATENT DOCUMENTS

FR 3051282 A1 11/2017

OTHER PUBLICATIONS

French Search Report for corresponding French Patent Application No. 2210835 dated May 2, 2023; priority document.

* cited by examiner

*Primary Examiner* — Ahmed M Saeed
(74) *Attorney, Agent, or Firm* — Greer, Burns & Crain, Ltd.

(57) ABSTRACT

An electrical protection device of circuit-breaker type including a casing, a severing system, positioned in the casing, configured to assume inactivated and activated states corresponding to the on and off states of the electrical protection device, respectively, and a connection system configured to assume an open state in which it allows the electrical cable to be inserted and a second, closed state in which it surrounds the electrical cable. The connection system and the severing system are configured and arranged such that, when the connection system is in the closed state, the severing system severs the electrical cable when passing from the inactivated state to the activated state.

13 Claims, 1 Drawing Sheet

ELECTRICAL PROTECTION DEVICE OF CIRCUIT-BREAKER TYPE WHICH CAN BE POSITIONED ON A CONTINUOUS ELECTRICAL CABLE

CROSS-REFERENCES TO RELATED APPLICATIONS

This application claims the benefit of the French patent application No. 2210835 filed on Oct. 20, 2022, the entire disclosures of which are incorporated herein by way of reference.

FIELD OF THE INVENTION

The present application relates to an electrical protection device of circuit-breaker type which can be positioned on a continuous electrical cable, and to an aircraft comprising at least one such electrical protection device.

BACKGROUND OF THE INVENTION

According to one embodiment which can be seen in FIG. 1, a power cable 10 is equipped with an electrical protection device 12 of circuit-breaker type connecting two sections 10.1, 10.2 of the power cable 10.

The electrical protection device 12 comprises a casing 14, a conductive bar 16 made of a conductive material which passes through the casing 14 and has first and second ends 16.1, 16.2 positioned outside the casing 14, and a severing system 18, positioned in the casing 14, configured to assume an inactivated state in which the severing system 18 does not interfere with the conductive bar 16 and an activated state in which the severing system 18 has severed the conductive bar 16. According to one embodiment, the severing system 18 comprises a blade 20 which can move between a first position, corresponding to the inactivated state, in which the blade 20 is away from the conductive bar 16, and a second position, corresponding to the activated state, in which the blade 20 has severed the conductive bar 16. The severing system 18 also comprises a control means 22 configured to cause, upon receiving a signal, the blade 20 to change position and to pass from the first position to the second position. The control means 22 is a pyrotechnic charge which is ignited upon receiving an electrical signal transmitted by an electrical cable 24.

In operation, the first end 16.1 of the conductive bar 16 is connected to the end of the first section 10.1 via a first electrical connection 26.1. The second end 16.2 of the conductive bar 16 is connected to the end of the second section 10.2 via a second electrical connection 26.2. The first and second electrical connections 26.1, 26.2 are configured to ensure electrical continuity between the first or second end 16.1, 16.2 of the conductive bar 16 and the end of the first or second section 10.1, 10.2.

In the event of a malfunction or when it has been activated, the electrical protection device 12 has to be replaced as quickly as possible. For this reason, the first and second electrical connections 26.1, 26.2 are detachable and are each in the form of a removable connector or of a fastening element keeping the first or second end 16.1, 16.2 of the conductive bar 16 pressed against the end of the first or second section 10.1, 10.2.

This embodiment is not satisfactory because the first and second electrical connections 26.1, 26.2 generate local heating by the Joule effect. This heating has to be taken into account when components of the electrical protection device 12 and surrounding elements are being designed, this resulting in oversizing and therefore in an increase in on-board mass.

According to another drawback, the first and second electrical connections 26.1, 26.2 may unintentionally become disconnected. This risk of disconnection has to be taken into account when calculating the probability of loss of electrical connection.

SUMMARY OF THE INVENTION

The present invention aims to overcome all or some of the drawbacks of the prior art.

For this purpose, one subject of the invention is an electrical protection device of circuit-breaker type designed to equip an electrical cable, the electrical protection device comprising a casing, a connection system configured to connect the casing and the electrical cable in operation, and a severing system, positioned in the casing, configured to assume inactivated and activated states corresponding to the on and off states of the electrical protection device, respectively.

According to the invention, the connection system is configured to have an open state in which it allows the electrical cable to be put in place and a closed state in which it surrounds the electrical cable in operation, the connection system and the severing system being arranged such that, when the connection system is in the closed state, the severing system severs the electrical cable when passing from the inactivated state to the activated state.

According to the invention, the electrical cable is continuous and there is no electrical connection prone to generating thermal heating. The absence of electrical connections also makes it possible to eliminate the risks of disconnection.

According to another feature, the connection system comprises a first part which is fixedly secured to the casing and a second part which can move with respect to the first part between a position away from the first part corresponding to the open state of the connection system and a position connected to the first part corresponding to the closed state of the connection system. In addition, the connection system comprises at least one fastener for holding the first and second parts in the connected position.

According to another feature, the first and second parts are semi-cylindrical shells which, once assembled, form a tube that surrounds the electrical cable in operation.

According to another feature, each of the first and second parts comprises first and second longitudinal edges. In addition, the connection system comprises at least one first fastener to connect the first longitudinal edges of the first and second parts to each other and at least one second fastener to connect the second longitudinal edges of the first and second parts to each other.

According to another feature, the connection system comprises a plurality of first fasteners distributed along the first longitudinal edges of the first and second parts and/or a plurality of second fasteners distributed along the second longitudinal edges of the first and second parts.

According to another feature, each first or second fastener comprises a first element which is fixedly secured to the first part and a second element which is fixedly secured to the second part, the first and second elements being configured to clip together in the closed state.

According to another feature, the severing system comprises a blade that can move in a direction of displacement between a first position corresponding to the inactivated state and a second position corresponding to the activated state. In addition, the connection system forms, in the closed state, a cylindrical tube that surrounds the electrical cable in operation, the blade being situated outside the tube in the first position and inside the tube in the second position.

According to another feature, the direction of displacement and the axis of revolution of the tube formed by the connection system in the closed state intersect and are substantially perpendicular.

According to another feature, the electrical protection device comprises at least one sealing system for isolating the blade from an environment outside a tube formed by the connection system in the closed state.

According to another feature, the sealing system comprises at least one first O-ring and at least one second O-ring which are inserted, in operation, between the electrical cable and the tube formed by the connection system in the closed state, the first O-ring being positioned between a first end of the tube and the blade, the second O-ring being positioned between a second end of the tube and the blade.

Another subject of the invention is an aircraft comprising at least one electrical cable and an electrical protection device according to one of the above features.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

Figure 3:
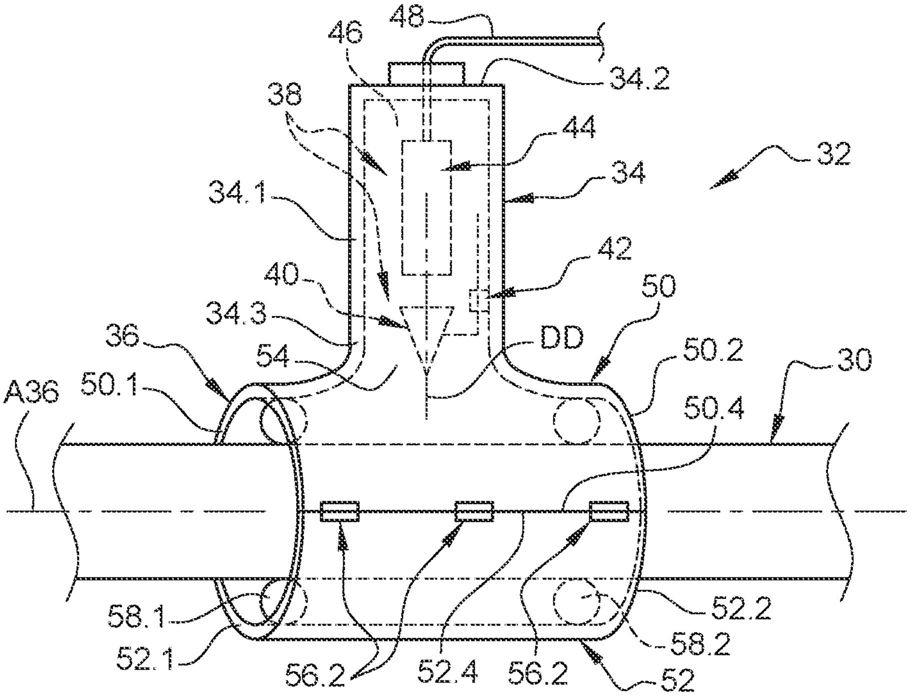
FIG. 3 is a schematic representation of an electrical protection device of circuit-breaker type, attached to an electrical cable, illustrating one embodiment of the invention.

According to one embodiment which can be seen in FIG. 3, an electrical cable 30 is equipped with at least one electrical protection device 32 of circuit-breaker type. This electrical cable 30 may be an electrical power cable of an electrical installation of an aircraft. The electrical protection device 32 is configured to assume an on state in which an electrical current may flow through the electrical cable 30 between two points situated on either side of the electrical protection device 32 and an off state in which no electrical current may flow through the electrical cable between these two points.

The electrical protection device 32 comprises a casing 34, a connection system 36 configured to connect the casing 34 and the electrical cable 30, and a severing system 38, positioned in the casing 34, configured to assume an inactivated state corresponding to the on state of the electrical protection device 32 and an activated state corresponding to the off state of the electrical protection device 32. According to one embodiment, the severing system 38 comprises a blade 40 which can move between a first position, corresponding to the inactivated state, in which the blade 40 is away from the electrical cable 30, and a second position, corresponding to the activated state, in which the blade 40 has severed the electrical cable 30. The severing system 38 comprises a guidance system 42 configured to guide the blade 40 with respect to the casing 34 between the first and second positions. By way of example, the guidance system 42 is a sliding connection that connects the blade 40 and the casing 34. This guidance system 42 is configured to guide the blade 40 in translation in a direction of displacement DD that intersects the electrical cable 30.

According to one configuration, the direction of displacement DD is substantially perpendicular to the electrical cable 30, at a right angle to the portion of the electrical cable that is positioned in the continuation of the direction of displacement DD.

The blade 40 is configured in accordance with the electrical cable 30 so as to obtain a certain severing of the electrical cable 30 when the blade 40 is transferred from the first position to the second position. When the electrical cable 30 comprises a protective layer on its surface, this protective layer may be removed in line with the blade 40 in order to aid the severing of the electrical cable 30.

According to one arrangement, the casing 34 has a cylindrical shape, has a cylindrical lateral face 34.1 and extends between first and second ends 34.2, 34.3. According to one configuration, the cylindrical lateral face 34.1 has an axis of revolution that coincides with the direction of displacement DD.

The first end 34.2 is closed off by a flat wall positioned in a plane that is perpendicular to the direction of displacement DD.

The severing system 38 also comprises a control means 44 configured to cause, upon receiving a signal, the blade 40 to change position and to pass from the first position to the second position. According to one configuration, the control means 44 is a pyrotechnic charge which is ignited upon receiving an electrical signal. This solution makes it possible to obtain a certain and fast severing of the electrical cable 30.

According to one arrangement, the control means 44 is positioned between the blade 40 and the first end 34.2 of the casing 34. The casing 34 comprises a housing 46, configured to house at least the blade 40, the guidance system 42 and the control means 44, which is open at the second end 34.3 of the casing 34 so as to let the blade 40 pass when the blade is being transferred from the first position to the second position.

According to one embodiment, the electrical signal is transmitted via an electrical cable 48 passing through the wall of the first end 34.2 of the casing 34.

The connection system 36 is configured to assume a first, open state in which it allows the electrical cable 30 to be inserted and a second, closed state in which it surrounds the electrical cable 30, the connection system 36 and the severing system 38 being arranged such that, when the connection system 36 is in the closed state, the severing system 38 severs the electrical cable 30 when passing from the inactivated state to the activated state.

The connection system 36 forms, in the closed state, a tube that surrounds the electrical cable, the blade 40 being situated outside the tube in the first position and inside the tube in the second position. This tube has an axis of revolution A36 that intersects the direction of displacement DD and is substantially perpendicular to the latter.

According to one configuration, the connection system 36 is configured to pinch the electrical cable 30 in the closed state in order to immobilize the casing 34 with respect to the electrical cable 30.

According to one embodiment, the connection system 36 comprises a first part 50 which is fixedly secured to the casing 34 and a second part 52 which can move with respect to the first part 50 between a position away from the first part 50 corresponding to the open state of the connection system 36 and a position connected to the first part 50 corresponding to the closed state of the connection system 36. In the connected position, the first and second parts 50, 52 are positioned either side of a plane that is substantially perpendicular to the direction of displacement DD. In addition, the connection system 36 comprises at least one fastener for holding the first and second parts 50, 52 in the connected position.

According to one arrangement, the first and second parts 50, 52 are semi-cylindrical shells which, once assembled, form a tube that surrounds the electrical cable 30 and clasps it. The first part 50 comprises an opening 54 so as to allow the blade 40 to move in translation from the first position to the second position.

The first and second parts 50, 52 extend between first and second ends 50.1, 50.2/52.1, 52.2. According to one arrangement, these first and second ends 50.1, 50.2/52.1, 52.2 are substantially centered with respect to the direction of displacement DD, and the first and second parts 50, 52 delimit, in the closed state, a tube.

According to one embodiment, the first and second parts 50, 52 are connected to each other by at least one joint that allows them to assume the open or closed state and the connection system 36 comprises at least one fastener configured to hold the first and second parts 50, 52 in the closed state.

Figure 1:
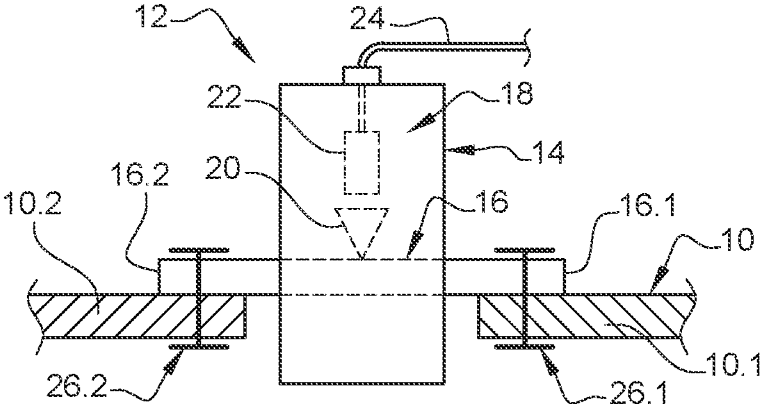
Fig. 1 Prior Art
FIG. 1 is a schematic representation of an electrical protection device of circuit-breaker type illustrating an embodiment of the prior art.
Figure 2:
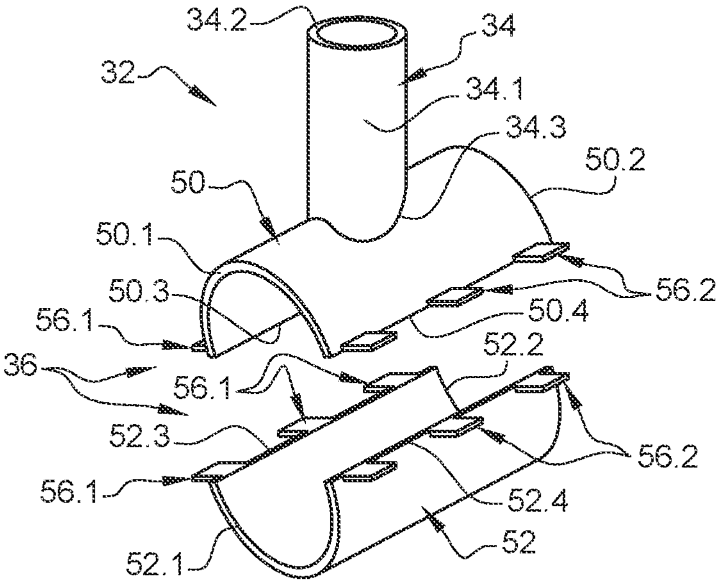
FIG. 2 is a perspective view of an electrical protection device of circuit-breaker type, in the detached state, illustrating one embodiment of the invention.

According to another embodiment which can be seen in FIG. 2, the first and second parts 50, 52 are independent of each other and are not connected by any joint.

Each of the first and second parts 50, 52 comprises first and second longitudinal edges 50.3, 50.4/52.3, 52.4, the connection system 36 comprising at least one first fastener 56.1 to connect the first longitudinal edges 50.3, 52.3 of the first and second parts 50, 52 to each other and at least one second fastener 56.2 to connect the second longitudinal edges 50.4, 52.4 of the first and second parts 50, 52 to each other.

According to one arrangement, the connection system 36 comprises a plurality of first fasteners 56.1 distributed along the first longitudinal edges 50.3, 52.3 of the first and second parts 50, 52 and/or a plurality of second fasteners 56.2 distributed along the second longitudinal edges 50.4, 52.4 of the first and second parts 50, 52.

Each first or second fastener 56.1, 56.2 comprises a first element which is fixedly secured to the first part 50 and a second element which is fixedly secured to the second part 52, the first and second elements being configured to clip together in the closed state.

According to one embodiment, the casing 34, the first part 50 and the first elements of the first and second fasteners 56.1, 56.2 are made in one piece, which is, for example, made of plastic. In addition, the second part 52 and the second elements of the first and second fasteners 56.1, 56.2 are made in one piece.

According to another feature, the electrical protection device 32 comprises at least one sealing system for isolating the blade 40 from an environment outside a tube formed by the connection system 36 when the latter is in the closed state. According to one embodiment, the sealing system comprises:

at least one first O-ring 58.1, inserted between the electrical cable 30 and a tube formed by the connection system 36 in the closed state and positioned between a first end of the tube and the blade 40 in operation, at least one second O-ring 58.2, inserted between the electrical cable 30 and a tube formed by the connection system 36 in the closed state and positioned between a second end of the tube and the blade 40 in operation.

According to the invention, the electrical cable is DC and there is no electrical connection prone to generating thermal heating.

According to one application, the electrical protection device 32 described above is more particularly intended for the high-power electrical circuits of an aircraft, in particular, of an aircraft having electric or hybrid propulsion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical protection device of circuit-breaker type configured to equip an electrical cable, the electrical protection device comprising:

a casing, a connection system configured to connect the casing and the electrical cable in operation, and a severing system, positioned in the casing, configured to assume an inactivated state and an activated state corresponding to an on state and an off state of the electrical protection device, respectively;

wherein the connection system is configured to have an open state in which the connection system allows the electrical cable to be put in place and a closed state in which the connection system surrounds the electrical cable in operation, the connection system and the severing system being configured and arranged such that, when the connection system is in the closed state, the severing system severs the electrical cable when passing from the inactivated state to the activated state, wherein the connection system comprises a first part which is fixedly secured to the casing and a second part which can move with respect to the first part between a disconnected position away from the first part corresponding to the open state of the connection system and a connected position connected to the first part corresponding to the closed state of the connection system, and wherein the connection system comprises at least one fastener for holding the first and second parts in the connected position.

2. The electrical protection device as claimed in claim 1, wherein the first and second parts are semi-cylindrical shells which, once assembled, form a tube that surrounds the electrical cable in operation.

3. The electrical protection device as claimed in claim 1, wherein each of the first and second parts comprises first and second longitudinal edges, and wherein the connection system comprises at least one first fastener to connect the first longitudinal edges of the first and second parts to each other and at least one second fastener to connect the second longitudinal edges of the first and second parts to each other.

4. The electrical protection device as claimed in claim 3, wherein the connection system comprises a plurality of first fasteners distributed along the first longitudinal edges of the first and second parts.

5. The electrical protection device as claimed in claim 3, wherein the connection system comprises a plurality of second fasteners distributed along the second longitudinal edges of the first and second parts.

6. The electrical protection device as claimed in claim 3, wherein the connection system comprises a plurality of first fasteners distributed along the first longitudinal edges and the second longitudinal edges of the first and second parts.

7. The electrical protection device as claimed in claim 3, wherein each first or second fastener comprises a first element which is fixedly secured to the first part and a second element which is fixedly secured to the second part, the first and second elements being configured to clip together in the closed state.

8. The electrical protection device as claimed in claim 1, wherein the severing system comprises a blade that is configured to move in a direction of displacement between a first position corresponding to the inactivated state and a second position corresponding to the activated state, and wherein the connection system forms, in the closed state, a cylindrical tube that surrounds the electrical cable in operation, the blade being situated outside the tube in the first position and inside the tube in the second position.

9. The electrical protection device as claimed in claim 8, wherein the direction of displacement and an axis of revolution of the tube formed by the connection system in the closed state intersect and are substantially perpendicular.

10. The electrical protection device as claimed in claim 8, wherein the electrical protection device comprises at least one sealing system for isolating the blade from an environment outside a tube formed by the connection system in the closed state.

11. The electrical protection device as claimed in claim 10, wherein the sealing system comprises at least one first O-ring and at least one second O-ring which are inserted, in operation, between the electrical cable and the tube formed by the connection system in the closed state, the first O-ring being positioned between a first end of the tube and the blade, the second O-ring being positioned between a second end of the tube and the blade.

12. An aircraft comprising at least one electrical cable and an electrical protection device as claimed in claim 1.

13. An electrical protection device of circuit-breaker type configured to equip an electrical cable, the electrical protection device comprising:

a casing, a connection system configured to connect the casing and the electrical cable in operation, and a severing system, positioned in the casing, configured to assume an inactivated state and an activated state corresponding to an on state and an off state of the electrical protection device, respectively;

wherein the connection system is configured to have an open state in which the connection system allows the electrical cable to be put in place and a closed state in which the connection system surrounds the electrical cable in operation, the connection system and the severing system being configured and arranged such that, when the connection system is in the closed state, the severing system severs the electrical cable when passing from the inactivated state to the activated state, wherein the severing system comprises a blade that is configured to move in a direction of displacement between a first position corresponding to the inactivated state and a second position corresponding to the activated state, wherein the connection system forms, in the closed state, a cylindrical tube that surrounds the electrical cable in operation, the blade being situated outside the tube in the first position and inside the tube in the second position, and, wherein the electrical protection device comprises at least one sealing system for isolating the blade from an environment outside a tube formed by the connection system in the closed state.

* * * * *